(12) United States Patent
Sazzad et al.

(10) Patent No.: US 6,621,867 B1
(45) Date of Patent: Sep. 16, 2003

(54) METHODS AND APPARATUS FOR DETECTING EDGES WITHIN ENCODED IMAGES

(75) Inventors: Sharif Mohammad Sazzad, Monmouth Junction, NJ (US); Frank Anton Lane, Medford Lakes, NJ (US)

(73) Assignee: Hitachi America, Ltd, Tarrytown, NY (US)

(*) Notice: Subject to any disclaimer, the term of this patent is extended or adjusted under 35 U.S.C. 154(b) by 0 days.

(21) Appl. No.: 09/390,274

(22) Filed: Sep. 7, 1999

Related U.S. Application Data
(60) Provisional application No. 60/108,580, filed on Nov. 16, 1998.

(51) Int. Cl.[7] .................................................. H04N 7/12
(52) U.S. Cl. ........................................................ 375/240.26
(58) Field of Search .................................... 348/575, 398.1; 382/233, 235, 232, 260, 266, 264, 263, 268; 375/240, 240.25, 240.29, 240.26

(56) References Cited

U.S. PATENT DOCUMENTS

| | | | | |
|---|---|---|---|---|
| 5,260,782 A | * | 11/1993 | Hui | 375/240.15 |
| 5,724,097 A | * | 3/1998 | Hibi et al. | 375/240.04 |
| 6,061,400 A | * | 5/2000 | Pearlstein et al. | 375/240 |
| 6,324,303 B1 | * | 11/2001 | Todd | 382/232 |
| 6,370,192 B1 | * | 4/2002 | Pearlstein et al. | 375/240 |
| 6,370,279 B1 | * | 4/2002 | Paik | 382/240 |
| 6,418,242 B1 | * | 7/2002 | Mauer | 382/266 |
| 6,477,279 B2 | * | 11/2002 | Go | 382/240 |

* cited by examiner

Primary Examiner—Chris Kelley
Assistant Examiner—Behrooz Senfi
(74) Attorney, Agent, or Firm—Straub & Pokotylo; Michael P. Straub

(57) ABSTRACT

Edge detection methods and apparatus which utilize the dc dct differential data included in encoded images, e.g., an MPEG-2 encoded video stream, are described. Use of the dc dct differential data allows efficient methods for detecting the presence of edges within encoded images. The edge detection methods and apparatus of the present invention can be used where differential coding of the DC DCT coefficients is employed. Accordingly, the edge detection methods of the present invention are applicable to MPEG-2 encoded images as well as other differentially encoded images.

25 Claims, 13 Drawing Sheets

METHODS AND APPARATUS FOR DETECTING EDGES WITHIN ENCODED IMAGES

RELATED APPLICATIONS

This application claims the benefit U.S. Provisional Application No. 60/108,580, filed Nov. 16, 1998.

FIELD OF THE INVENTION

The present invention relates to digital image processing and, more specifically, to the detection of edges in images, e.g., differentially encoded images.

BACKGROUND OF THE INVENTION

As a result of image processing, edges are often introduced into images. Letterboxing of movies for display on television is an example of one form of image processing that introduces horizontal edges into images. In the case of letterboxing, black regions are added to the lower and upper portions of an image.

An example of letter boxing is shown in FIG. 1. As illustrated, a letterbox image 10 comprises upper and lower black borders 12, 12' and a central image region 14. Horizontal edges 13, 13' result from the transition from the black border regions 12, 12' to the center image region 14. The horizontal edges 13, 13' resulting from letter boxing are often strong edges due to the black nature of the border regions 12, 12'.

Various image processing operations require information about the presence of edges, such as those resulting from letterboxing, within an image.

One known edge detection technique, referred to as the gradient method is described in *Digital Image Processing*, by William K. Pratt (1991). The gradient method involves the computation of the first derivative of the pixel data. This usually involves calculating pixel differences from unencoded pixel values. This can involve a considerable number of processing operations.

Accordingly, the known gradient method edge detection technique suffers from the disadvantage of requiring a substantial amount of image processing to detect edges in an image. Furthermore, the known edge detection technique normally involves the use of unencoded, e.g., uncompressed, image data. Accordingly, in order to detect an edge in an encoded image, the image normally needs to be completely decoded prior to detecting edges within the image.

For data storage and transmission purposes, images are normally encoded, e.g., compressed, to reduce the amount of data used to represent an image. Prior to use, e.g., subsequent image processing and/or display, encoded images are normally decoded.

Differential coding of discrete cosine transform coefficients (DCTs) is used in a wide variety of image encoding schemes including, e.g., the international video standard. MPEG-2 (ISO/IEC 13818-2). MPEG-2 has been used as the basis for several commercial applications including digital video disks (DVD) and digital broadcast television.

In accordance with MPEG-2, pixels are normally grouped into blocks for encoding purposes. The term block is used in the present application to refer to luminance (luma) blocks. Each block corresponds to 16 pixels. There are four blocks per macroblock. FIG. 2 illustrates the relationship of the four luma blocks (0, 1, 2, 3) of a macroblock 20.

In MPEG-2, the slice syntax element is used to encapsulate data used to decode individual macroblocks. Multiple slices may exist in a given macroblock row of an image, however a slice cannot span across rows of macroblocks. The slice syntax element also carries the slice_vertical_position which provides information about the vertical position of the macroblock data. The vertical position is measured in macroblock units from the top of the picture. MPEG-2 requires that all the slices that may be present in a given row of macroblocks carry the same slice_vertical_position value. The value of the slice_vertical_position may be used to determine when the macroblock data corresponding to a given row of macroblocks has been fully observed. This is done by noting when the value of the slice_vertical_position increases by one unit.

FIG. 3 illustrates an image segment 30 corresponding to an upper portion of the image 10. In FIG. 3, a horizontal row of macroblocks corresponding to, e.g., a slice 31, is shown passing through the horizontal edge 13.

In the slice 31, first and second blocks of each macroblock have similar luminance characteristics because they both correspond to the black border region 12. In addition, the third and fourth blocks of each macroblock have similar luminance characteristics because they both correspond to the center image region 14. However, it can be seen that, for each macroblock 32, 33, 34, 35, 36, the upper two blocks (blocks 0, 1) will have a DC level that is noticeably different from that of the lower two blocks (blocks 2, 3) since there is a large, difference in the luminance characteristics of the upper and lower blocks. It is this difference in luminance characteristics which is responsible for the presence of the horizontal edge 13.

As part of the MPEG-2 encoding process, discrete cosine transform encoding is performed on image data to produce a plurality of discrete cosine transform (DCT) coefficients. In order to reduce the amount of data used to represent the encoded images, DC DCT coefficients are frequently represented as differential values, i.e., values which indicate the difference from a preceding DC DCT coefficient value. Such a differential value is described in the MPEG-2 specification as a dc_dct_differential.

Thus, in MPEG-2, the DC components of blocks of intra-coded macroblocks are encoded differentially across a slice. This takes advantage of the fact that the DC level of a picture does not ordinarily exhibit sharp changes across small regions. By differentially encoding the DC coefficients, it is possible, in the mean, to obtain a certain degree of data compression.

FIG. 4 shows how MPEG-2 differential encoding proceeds throughout the blocks 32, 33 in the slice 31 of macroblocks. For the very first macroblock 32 in a slice, the DCT DC predictors are reset. Thus, the first block, block 0, is differentially coded using a preceding DC DCT value of 0 to generate the dc_dct_differential. The effect of coding the first block of a slice in this manner is the same as performing non-differential coding since the coding does not use an actual preceding DC DCT coefficient value. By restarting the differential coding with the first block of each slice, the propagation of errors is reduced at the expense of having to explicitly encode the first DC DCT coefficient of a slice. After the first block of the first macroblock of a slice, the DCT DC coefficients are differentially encoded using a preceding DC DCT coefficient in the slice as a reference value.

Since the macroblock 32 is the first macroblock in slice 31, the dc_dct_differential for block 0 will correspond to the actual DC DCT value for this block. The DC DCT for block 1 of the first macroblock 32 is differentially coded using the DC DCT value of block 0 as the predictor. Considering the edge shown in FIG. 1 there is uniformity between the DC DCT values of blocks 0 and 1 so the dc_dct_differential for block 1 will be small.

In the case of block 2 of macroblock 32, the DC DCT will be differentially coded using the DC DCT value of block 1 as the predictor. When there is uniformity between the DC value of the blocks, the dc_dct_differential is expected to be small. However, a large dc_dct_differential is expected when a horizontal edge is present.

Considering FIG. 3 as an example, it will be seen that when a horizontal edge is present there is a large difference in the DC levels of blocks 1 and 2 due to the horizontal edge 13. This results in a dc_dct_differential for block 2 which will be large compared to that for block 1.

When differentially coding block 3, the DC DCT value of block 2 of the same macroblock is used as the predictor. In the FIG. 3 example, the differential for block 3 of the first macroblock 32 will be small. This is because the differences in the DC levels of blocks 2 and 3 of macroblock 32 are small or non-existent. After coding the DC DCT values for block 3, encoding of the first macroblock is finished.

To differentially encode the first block of a macroblock, which is not the first macroblock of a slice, the DC DCT value of block 3 of the previous macroblock is used as the predictor. The dc_dct_differentials for the remaining blocks of the macroblock are coded using the DC DCT of the preceding block as the predictor. When the image is uniform throughout a region, the dc_dct_differentials will be small. However, when sharp edges are present this will not be the case.

In the FIG. 3 example, it can be seen that there is a large difference in the DC DCT levels of block 3 of the first macroblock 32 and block 0 of the second macroblock 33. In fact, the dc_dct_differential will have the opposite sign to the dc_dct_differential for block 2 of the first macroblock 32. Considering the FIG. 3 example further, it will be seen that the dc_dct_differential for block 1 will be relatively small, while the dc_dct_differential for block 2 will be large and opposite in magnitude to that of block 0. The dc_dct_differential for block 3 of macroblock 33 should be small. A similar pattern of alternating small and large dc_dct_differential values will occur for the remaining macroblocks 34, 35 and 36 of exemplary slice 31 due to the existence of horizontal edge 13.

The differential encoding of the macroblocks in a slice proceeds as described above for subsequent macroblocks in a slice. At the start of the next slice, the predictors are reset and the process is repeated for the entire length of the picture, e.g., image, being coded.

The MPEG-2 video standard describes in detail the processes involved in decoding a video bitstream that is compliant with its syntax. As part of the video decoding process, the dc_dct_differential values are extracted from the encoded bitstream and are used to generate decoded image data. Accordingly, the dc_dct_differentials are readily obtainable from an encoded MPEG-2 bitstream and may be obtained without having to fully decode the encoded picture.

Information about the presence of edges can be used by a video decoder to control various aspects of the decoding process. It can also be used to control various image processing operations performed on decoded image data.

Given the use of encoding to store and transmit image data, the ability to detect edges within images without first having to fully decode encoded image data used to represent the images is desirable. Accordingly, there is a need for methods and apparatus that can detect edges within images represented by encoded image data.

From a processing efficiency perspective, there is also a need for methods and apparatus for detecting edges, which are less processor intensive than the known gradient technique described above. Accordingly, there is also a need for new edge detection techniques that can be used to detect edges in a manner that is efficient from a processing and/or implementation perspective.

SUMMARY OF THE INVENTION

The present invention is directed to methods and apparatus for detecting edges within images, e.g., in images represented by encoded image data.

In accordance with the present invention, dc_dct_differentials included in encoded image data are examined to determine the presence of an edge within an image portion, e.g., row or column, to which the examined dc_dct_differential data corresponds.

To identify horizontal edges in an image, dc_dct_differential data corresponding to a row of macroblocks is examined. In various horizontal edge detection embodiments, the dc_dct_differential data corresponding to differentials between vertically displaced blocks is extracted from an encoded bitstream and processed to detect horizontal edges. Thus, when detecting horizontal edges all or some dc_dct_differentials corresponding to horizontally displaced blocks are ignored, e.g., discarded, and the differentials corresponding to vertically displaced blocks are examined to detect horizontal edges. In some embodiments, the dc_dct_differential corresponding to the first block of the first macroblock in a slice is also ignored, e.g., discarded, since it is not differentially coded based on an actual preceding DC DCT image value.

To identify vertical edges in an image, dc_dct_differential data corresponding to a column of macroblocks is examined. In various vertical edge detection embodiments, the dc_dct_differential data corresponding to horizontally displaced blocks is extracted from an encoded bitstream. Thus, when detecting vertical edges all or some dc_dct_differentials corresponding to vertically displaced blocks are ignored, e.g., discarded, and the differentials corresponding to blocks which are displaced within an image horizontally but not vertically are examined to detect vertical edges.

Examination of dc_dct_differential data to detect edges includes performing an analysis operation, which may include, e.g., one or more filtering operations, and one or more threshold comparison tests.

In a first exemplary embodiment, dc_dct_differential data being examined to detect an edge is filtered using, e.g., a moving average filter, and the filter output is compared to a threshold. When the threshold is exceeded, an edge is declared present in the image portion represented by the row or column of macroblock data being examined.

In other embodiments, dc_dct_differential data being examined to detect an edge is filtered using, e.g., a filter which detects the occurrence of consecutive dc_dct_differential values each of which exceeds a threshold, e.g., a threshold which is determined as a function of a preceding dc_dct_differential value. An edge is declared present if a threshold number of dc_dct_differentials satisfying the threshold and the consecutive occurrence requirement are detected.

To further refine the edge detection process, in some embodiments a fixed number of consecutive dc_dct_ differentials exceeding the threshold discussed above, must be detected before an accumulated count of such events is incremented. The accumulated count is the value that is compared to the ultimate edge detection threshold that is used to determine if an edge is present.

The methods and apparatus of the present invention have the advantage over other systems of being able to detect the presence of an edge within a row or column of encoded image data without the need to fully decode the data in order to detect the presence or absence of an edge. In addition, the edge detection techniques of the present invention are relatively easy to implement and are less processor intensive than the known gradient technique of detecting edges.

Various additional features and advantages of the present invention will be apparent from the detailed description which follows.

DETAILED DESCRIPTION

As discussed above, the present invention is directed to methods and apparatus for detecting edges within images. Various embodiments of the present invention are directed to detecting edges in encoded images without first having to fully decode the encoded image data. As will be discussed in detail below, in accordance with the present invention dc_dct_differential data is extracted from an encoded bitstream. The extracted dc_dct_differential data is then processed and examined to detect the presence of one or more edges, e.g., horizontal or vertical edges in the image or image segment represented by the encoded data. The edge information can then used in various image processing operations including, e.g., image decoding operations.

Figure 1:
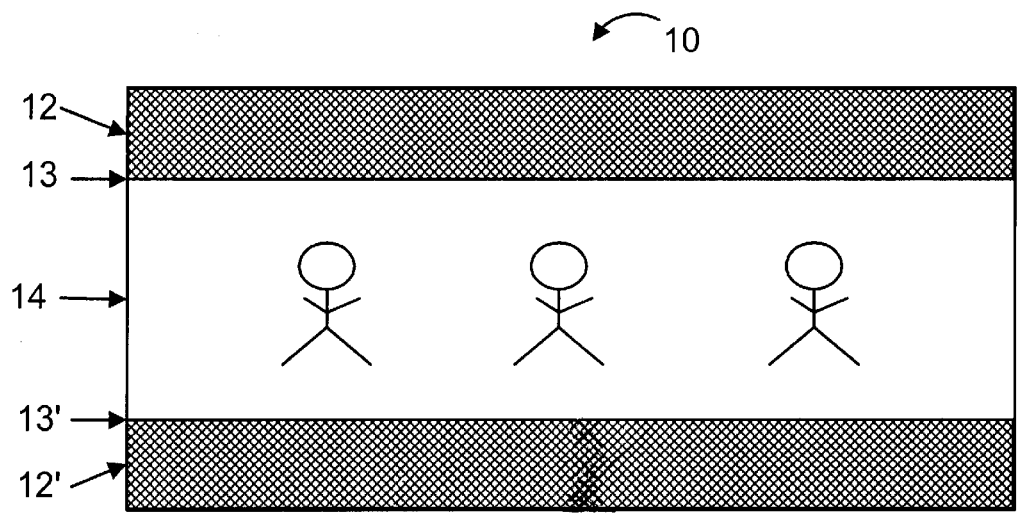
FIG. 1 illustrates an image in letter box format.
Figure 2:
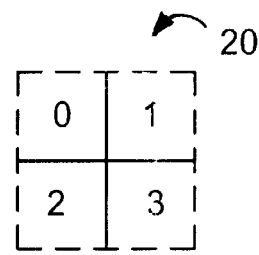
FIG. 2 illustrates the relationship between four luminance blocks which are included in a macroblock in accordance with MPEG-2.
Figure 3:
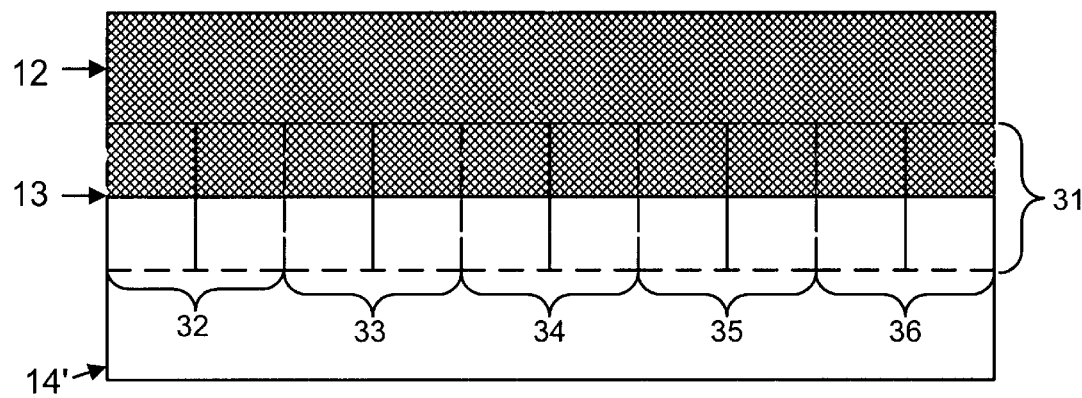
FIG. 3 illustrates a horizontal row of macroblocks extending through the edge created by the intersection of the upper black border region and the central image region of the image shown in FIG. 1.
Figure 4:
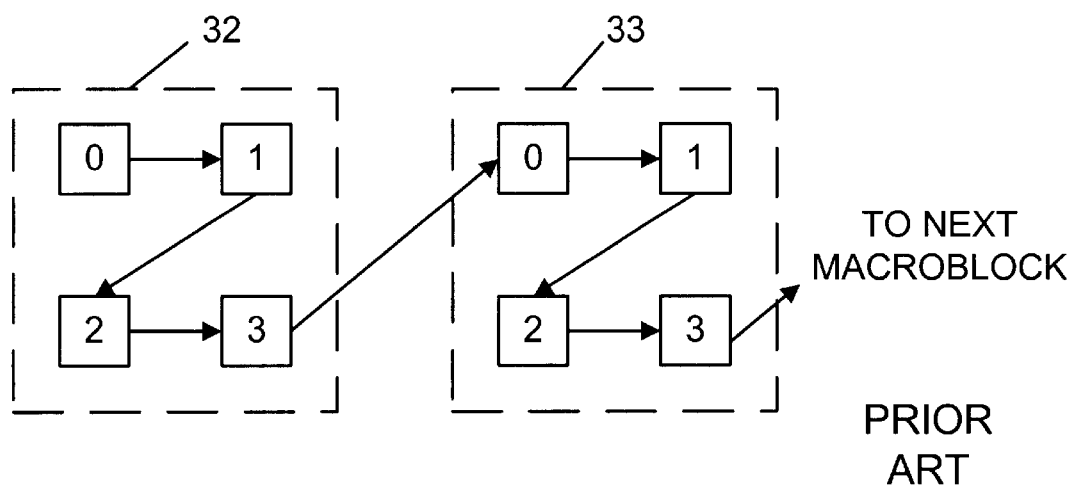
FIG. 4 illustrates the known MPEG-2 encoding relationship between blocks used to generate dc_dct_differentials corresponding to a slice.
Figure 5:
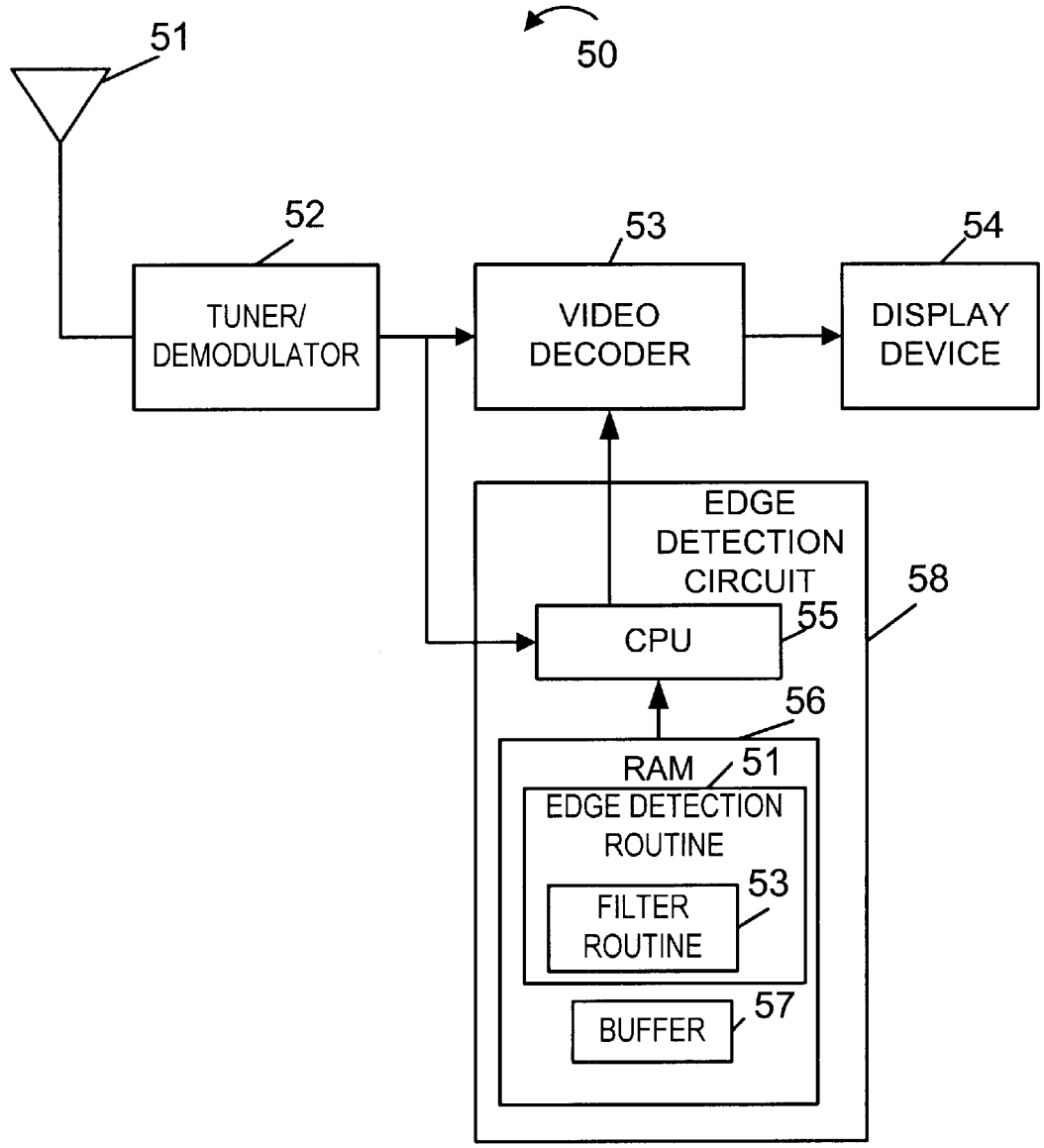
FIG. 5 illustrates a system of the present invention for decoding and displaying images.

FIG. 5 illustrates an exemplary image processing system 500 which can be used to implement the edge detection techniques of the present invention. As illustrated the system 500 includes an antenna 51, a tuner/demodulator 52, a video decoder 53, a display device 54 and an edge detection circuit 58. The antenna 51 is used to receive broadcast video, e.g., television, signals. The tuner/demodulator 52 filters the received signals to isolate a selected channel from a plurality of television signals, and demodulates the selected signal. The video decoder 53 is used to decode the received signals output by the tuner/demodulator 52 prior to their display on the display device 54.

The video decoder 53, uses horizontal edge information obtained from the edge detection circuit 58 to identify and distinguish between the border regions 12, 12' and the central image region 14 of a letterbox image.

In order to conserve processing and memory resources, the decoder 53 is designed to fully decode the central image region 14 of a letterboxed image but not the encoded image data corresponding to the upper and lower black border regions 12, 12' since these border image regions include a known black image content.

In the FIG. 5 embodiment, the exemplary edge detection circuit 58 signals the video decoder 53 when an edge, e.g., a horizontal image edge, is detected within a row of macroblocks. As will be discussed below, in other embodiments the edge detection circuit 53 is used to detect edges in columns of macroblocks and/or a portion of a row or column of macroblocks.

As illustrated, the edge detection circuit 58 comprises a CPU 55 and memory, e.g., RAM 56. The CPU 55 processes encoded image data, e.g., dc_dct_differential values, under control of the an edge detection routine 51 included the RAM 56. The RAM 56 also includes a buffer 57 for storing dc_dct_differential values during use by the edge detection routine 51.

Edge discontinuities are a special case of image encoding where the assumption of spatial (luminance) similarity which gave rise to the use of dc_dct_differential coding fails. Due to the sharp changes in the DC level across a strong edge, when the DC coefficients are differentially coded it is found that the dc_dct_differential values for a row or column of macroblocks exhibit large and somewhat periodic changes in magnitude when a sharp horizontal or vertical edge. passes through a row or column of macroblocks, respectively, coded using dc_dct_differential values.

The methods and apparatus of the present invention take advantage of the fact that differential coding of DC DCT values produces relatively large dc_dct_differential values when the differential encoding is performed using DC DCT values corresponding to blocks which are entirely or partially on different sides of an edge.

Figure 10:
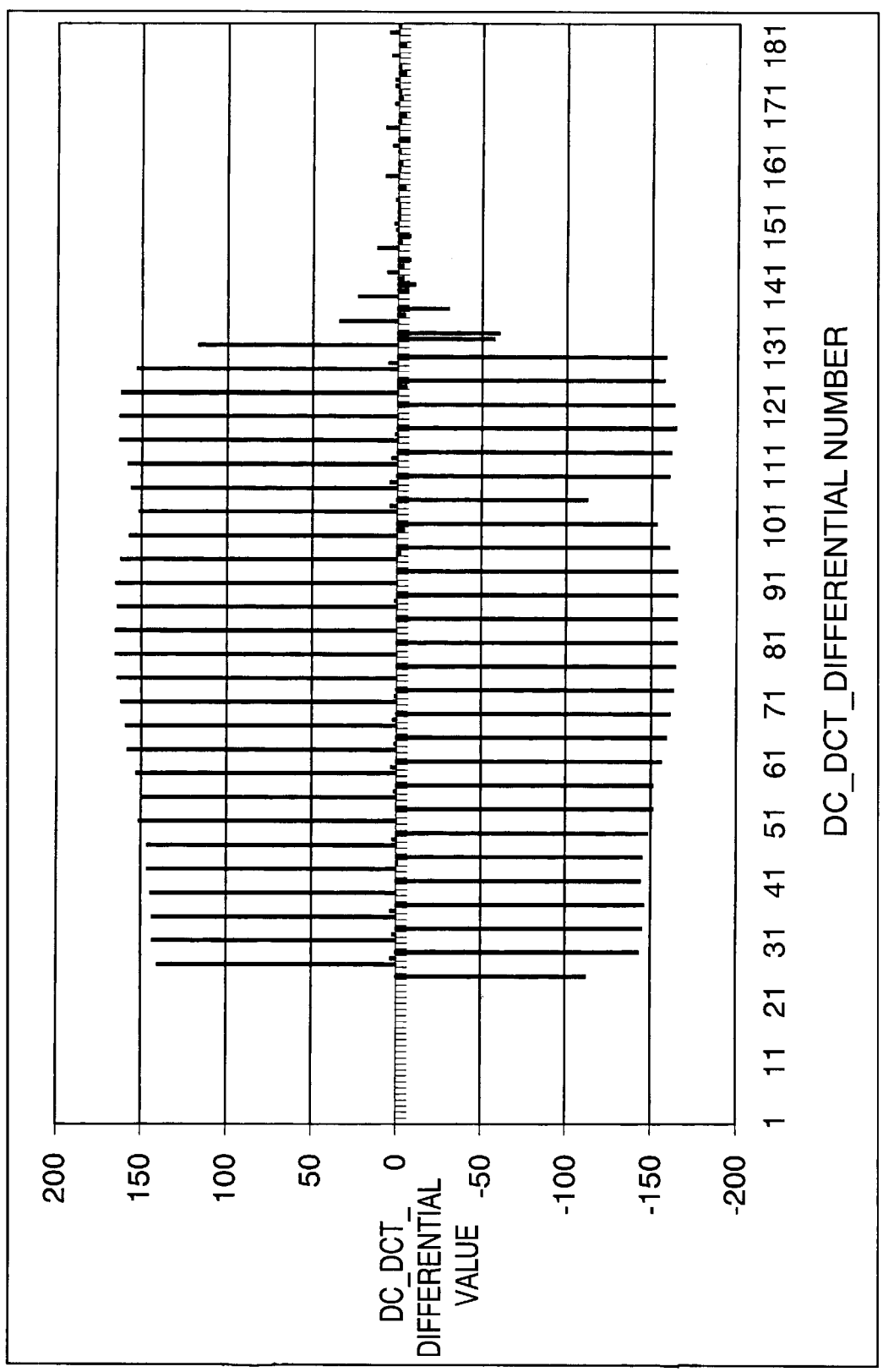
FIG. 10 is a graph of exemplary dc_dct_differential data corresponding to a row of macroblocks.

FIG. 10 shows a set of exemplary dc_dct_differential values, excluding dc_dct_differential values for the first block of each slice, for a row of macroblocks which includes a horizontal edge. The data illustrated in FIG. 10 corresponds to an image that includes a transition, e.g., horizontal edge, from a black, inactive (non-varying) picture region to a dark image region on the left and right sides of the image and a lightly colored active (varying) picture region towards the center of the image. As can be expected, there is a regular behavior in terms of dc_dct_differential values that is due to the way the blocks within a macroblock are positioned relative to the horizontal edge. On the left and right sides of FIG. 10, the dc_dct_differential values are zero or nearly zero since the image region is consistently dark in these areas. Towards the center of FIG. 10, it can be seen that the dc_dct_differential values have a large value, then a small value, then a large value (of opposite sign), then a small value, and this pattern is repeated. Note also that the large values of DCT DC differential are quite close and do not vary much in terms of magnitude. This behavior is consistent with the presence of a strong horizontal edge.

The dc_dct_differentials of the first and third blocks of a macroblock, i.e., blocks 0 and 2, correspond to transitions between vertically displaced blocks. Accordingly, the block 0 and 2 dc_dct_differential values are useful in detecting horizontal edges.

In various embodiments, when attempting to identify horizontal edges in accordance with the present invention, the dc_dct_differentials for blocks 0 and 2 are extracted from the received encoded image data and used for edge detection purposes. The dc_dct_differential values for blocks 1 and 3 are ignored, e.g., discarded. These differentials can be ignored because their values have similar behavior whether or not there is a horizontal edge. Also, the dc_dct_differential value for block 0 can, and in various horizontal edge detection embodiments is, ignored when it is the first block in a slice. The dc_dct_differential of the first macroblock in a slice can be ignored since that data is not differentially coded based on an actual preceding dc_dct_differential value.

The dc_dct_differential values of the second and fourth blocks of a macroblock, i.e., blocks 1 and 3, correspond to transitions between horizontally displaced blocks. Accordingly, the block 1 and 3 differential values are useful in detecting vertical edges in columns of macroblocks but not in detecting horizontal edges.

In various embodiments, when attempting to identify vertical edges in accordance with the present invention, the dc_dct_differential values for block 1 and 3 are extracted from the encoded image data while the dc_dct_differentials for blocks 0 and 2 are ignored, e.g., discarded.

In order to simplify processing, the absolute values, i.e., magnitudes, of the dc_dct_differential values can be used for edge detection purposes with reasonable success. The sign of the dc_dct_differentials can be ignored since, in the majority of cases, the sign of the data is not critical to the detection process of the present invention. This is the case because a checker-board pattern of blocks which might result in a row or column of macroblocks being misinterpreted as an edge, in the absence of dc_dct_differential sign information, rarely occurs for a significant length in common real life images.

Figure 6:
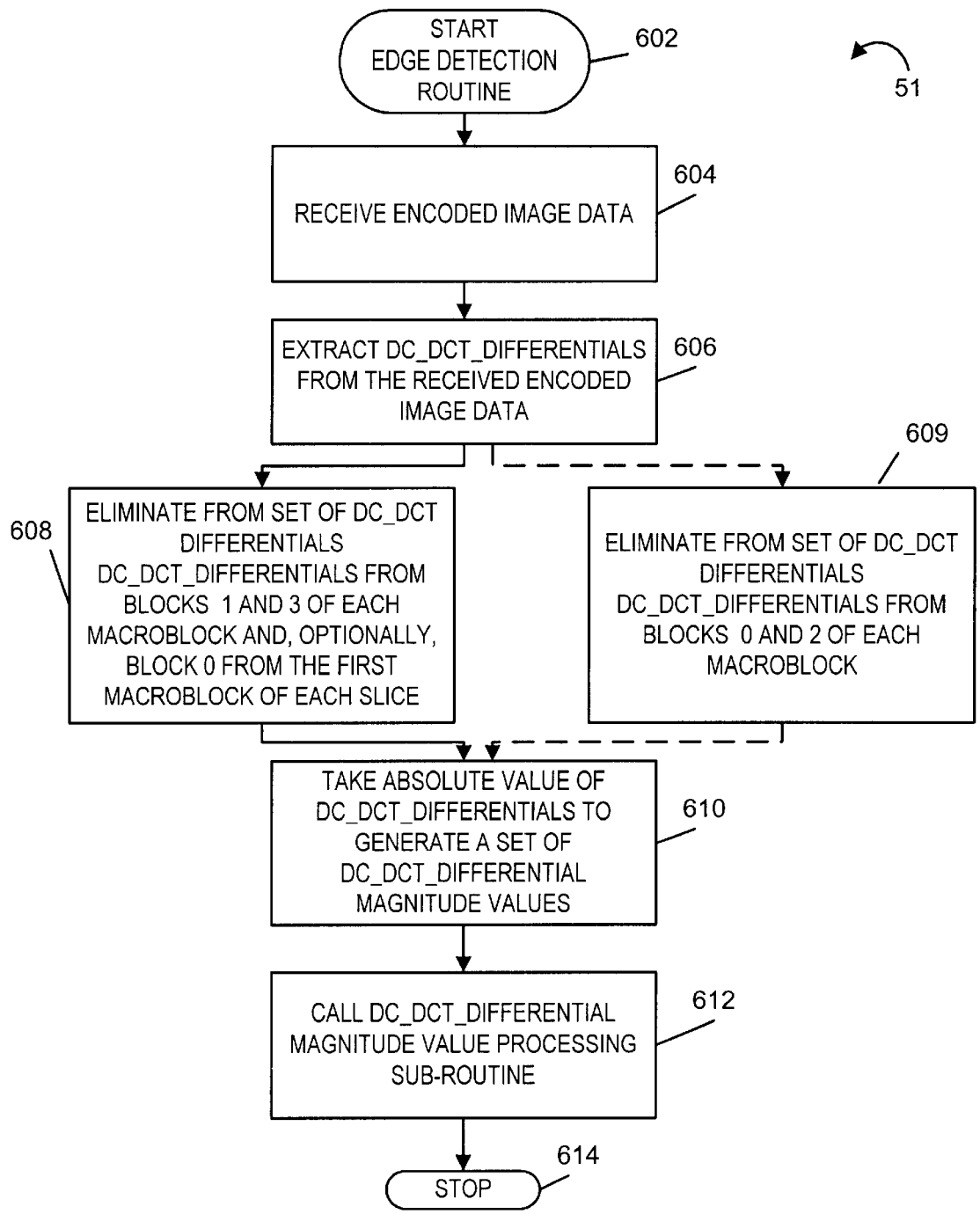
FIG. 6 is a flow chart illustrating a method of the present invention for detecting edges within an image.

FIG. 6 illustrates the edge detection routine 51 of the present invention in detail. As illustrated the routine 51 starts in step 602 wherein the routine 51 begins being executed by CPU 55. Next, in step 604 encoded image data, e.g., data corresponding to a row of macroblocks in a horizontal edge detection embodiment, is received. In step 604, in a vertical edge detection embodiment, encoded image data corresponding to a vertical column of macroblocks is received. Then in step 606, dc_dct_differential values are extracted from the received encoded image data. Slice_vertical_ vertical_position values and changes in the slice_vertical_ position value, indicating the end of a row of macroblocks, may also be extracted from the received encoded data in step 606. Next, in step 608, which is used in the horizontal edge detection case, dc_dct_differential values corresponding to blocks 1 and 3 of each macroblock are eliminated and, optionally, the dc_dct_differential corresponding to block 0 of the first macroblock in each slice is also eliminated, e.g., discarded. When vertical edges are to be detected, step 609 is used instead of step 608 and the dc_dct_differentials corresponding to blocks 0 and 2 of each macroblock are eliminated from the dc_dct_differential values used for edge detection purposes.

Steps 608 and 609 produce a set of processed dc_dct_ differential values that are used for edge detection purposes. The absolute value of the dc_dct_differential values produced in step 608 or 609 is taken in step 610 to produce a set of dc_dct_differential magnitude values.

In step 612, a dc_dct_differential magnitude value processing sub-routine is called. It is the dc_dct_differential magnitude processing sub-routine which determines, based on the dc_dct_differential magnitude values generated in step 610, whether or not an edge is present in the row or column to which the dc_dct_differential magnitude values correspond. Various dc_dct_differential magnitude processing sub-routines, used in different embodiments of the present invention will be discussed in detail with reference to FIGS. 7, 8 and 9. In the FIG. 9 embodiment, the detected slice-vertical-position signal is transmitted to the sub-routine 900 after all the dc_dct_differential magnitude values corresponding to a row of macroblocks is provided to the sub-routine.

With a return from the dc_dct_differential magnitude processing sub-routine, operation of the edge detection routine 51 stops in step 614 pending its re-execution to process another row or column of macroblock data.

Figure 11:
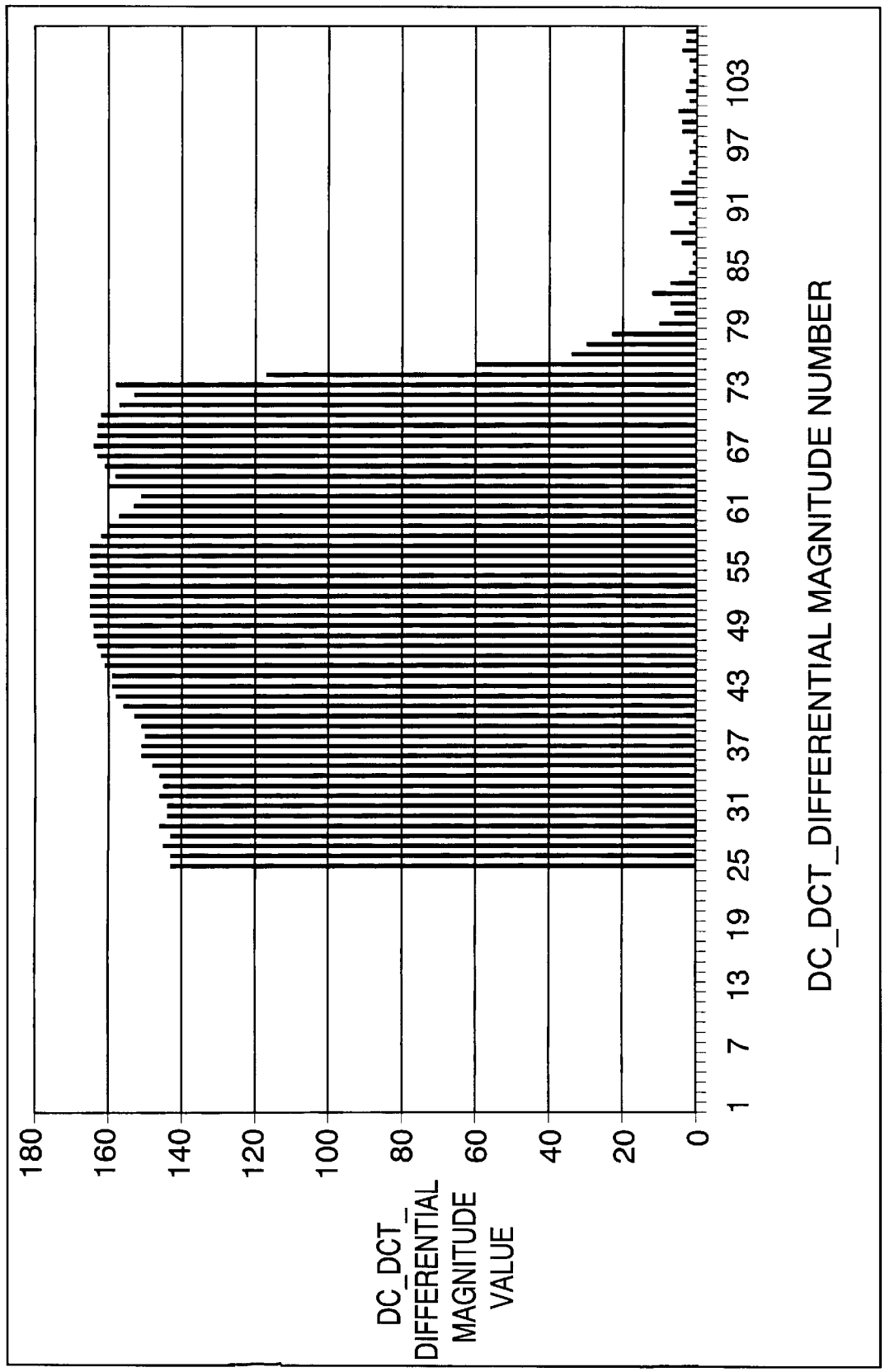
FIG. 11 is a graph of the dc_dct_differential magnitude values resulting from processing dc_dct_differential values as part of the edge detection process of the present invention.

FIG. 11 illustrates a plot of the magnitude values of dc_dct_differentials, for a row of macroblocks of an image intended for use in detecting the presence or absence of a horizontal edge. The dc_dct_differential values illustrated in FIG. 11 are the values remaining after the dc_dct_ differentials corresponding to the second and fourth blocks of each macroblock are discarded and the first dc_dct_ differential of each slice is discarded. Note that the data illustrated in FIG. 11 is from an image with a strong horizontal edge at the center of the row, but little or no horizontal edges on the left and right sides of the row to which the data corresponds.

The differential coding of the DC DCT data of the blocks, which fall successively on either side of the horizontal edge, causes the illustrated characteristic surge of activity in the center of the FIG. 11 graph. Note that before and after the portion of the graph corresponding to the horizontal edge, the magnitudes of the graphed dc_dct_differential values are relatively small in comparison to that observed at the center portion of the graph which corresponds to the edge.

The inventors of the present application realized that various statistics can be generated, e.g., through the use of one or more filters, from the dc_dct_differential values that represent all or a portion of a row or column of macroblocks. It was further realized that such statistics could be used to perform edge detection, e.g., as part of a dc_dct_ differential magnitude processing routine.

A desirable property of statistics used for edge detection purposes is that they allow simple tests, such as a threshold test, for declaring whether or not an edge exists. Various exemplary statistics and associated edge detection methods of the present invention are described below.

A first statistic which is useful for detecting edges is derived, in one embodiment of the present invention, from a moving average of the absolute dc_dct_differential data. The moving average is generated by filtering, e.g., summing, a number of samples, e.g., 50 samples, to produce an output value. The position of the filter relative to the input data set is then moved so that a new output values is generated as a function of a new sample and 49 previous samples. In this manner, a plurality of filter output values are generated from the dc_dct_differential magnitude values being used for edge detection purposes. The moving average filter may be implemented in software as in the FIG. 5 embodiment or through hardware.

Figure 12:
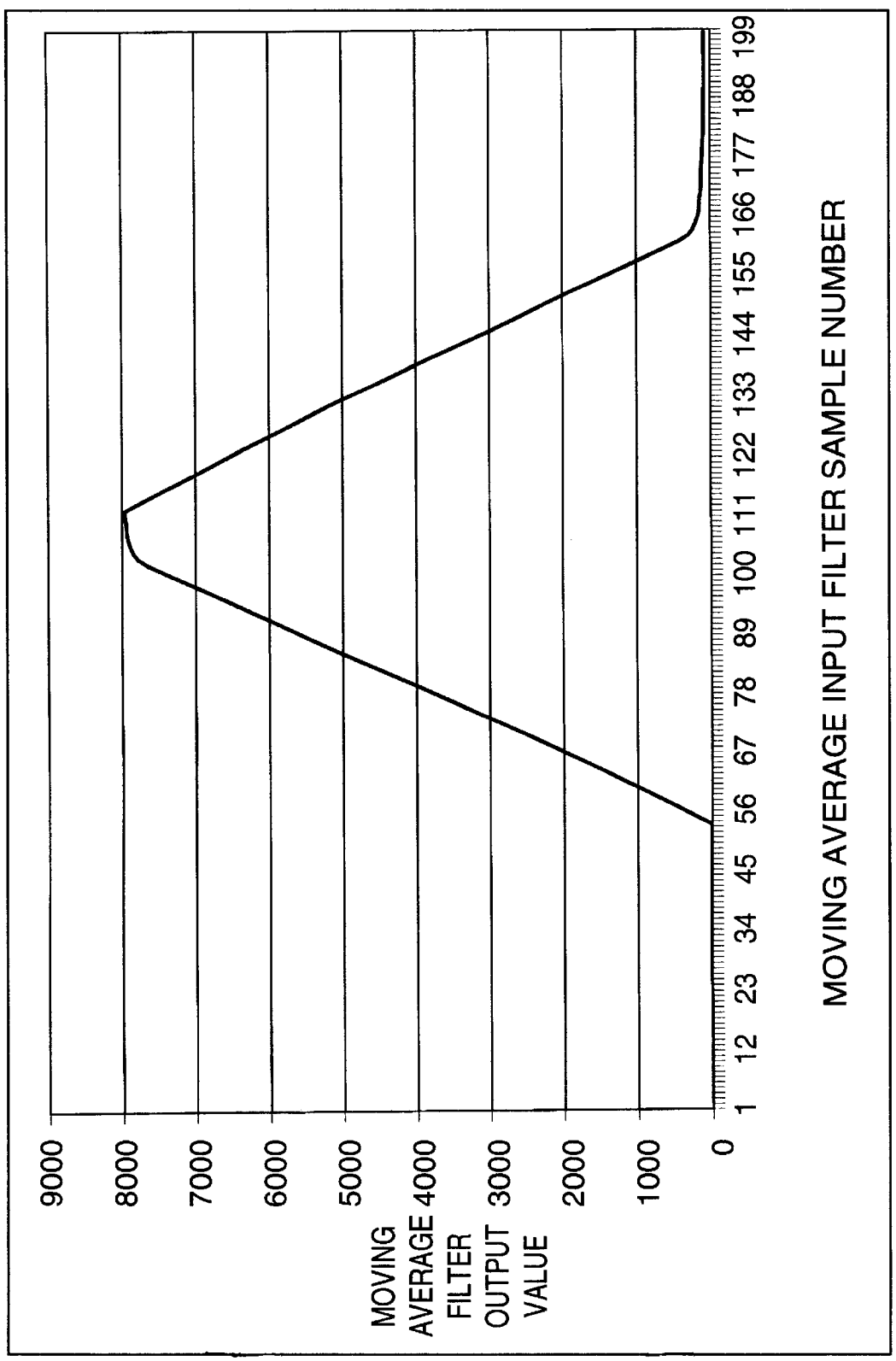
FIG. 12 is a graph illustrating the result of applying a moving average filter to the differential data illustrated in FIG. 11.

The idea behind this detection technique is that as a moving average window slides though the dc_dct_differential magnitude values of an image, a peak in filter output values will occur in regions where the activity of the dc_dct_differential magnitude values, is high, e.g., where a strong edge exists. An example of this is shown in the FIG. 12 where a moving average filter with a width equal, or approximately equal, to 50 dc_dct_differential magnitude values, is used upon the dc_dct_differential magnitude values shown in FIG. 11. The moving average filter results shown in FIG. 12 exhibit a peak when the window corresponding to the filter input slides into the dc_dct_differential values corresponding to the center of the row of macroblocks where a strong horizontal edge exists. Then, as the window exits the active region where the strong edge exists, the output value of the moving average filter begins to fall. By comparing the moving average statistic, i.e., the output of the moving average filter against a threshold, it is possible to detect the presence and position of a horizontal edge in the row of image data being processed. When the filter output threshold used to determine the presence of an edge is exceeded, the presence of an edge is declared.

There are two parameters in this method that should be carefully chosen. The first is the threshold with which to test the filter output, i.e., moving average statistic. If the threshold is set too high, then for a transition from a black to active picture region that is not highly contrasted, the differentials will be relatively small and the moving average will produce values that do not exceed the threshold even though an edge exists. On the other hand if the threshold is set too small, the test may yield more edges than actually exist. The second parameter is the size of the moving average window. This should be selected so that the moving average provides adequate smoothing of the differential data while still providing sufficient resolution for good edge detection. This is especially important when only a partial edge exists across a picture or if the edge occurs such that its extent in a macroblock is only one pixel. In both cases, the observation of the edge using the differential data will be more difficult. Both the first and second parameters, i.e., the edge detection threshold and the filter width, may be experimentally determined for a given application through a small amount of trial and error using image data that is exemplary for the particular application for which edge detection is to be used. Given data of the type illustrated in FIG. 11, a filter width of 50 and a threshold value of 7000 may be used to provide satisfactory results.

Figure 7:
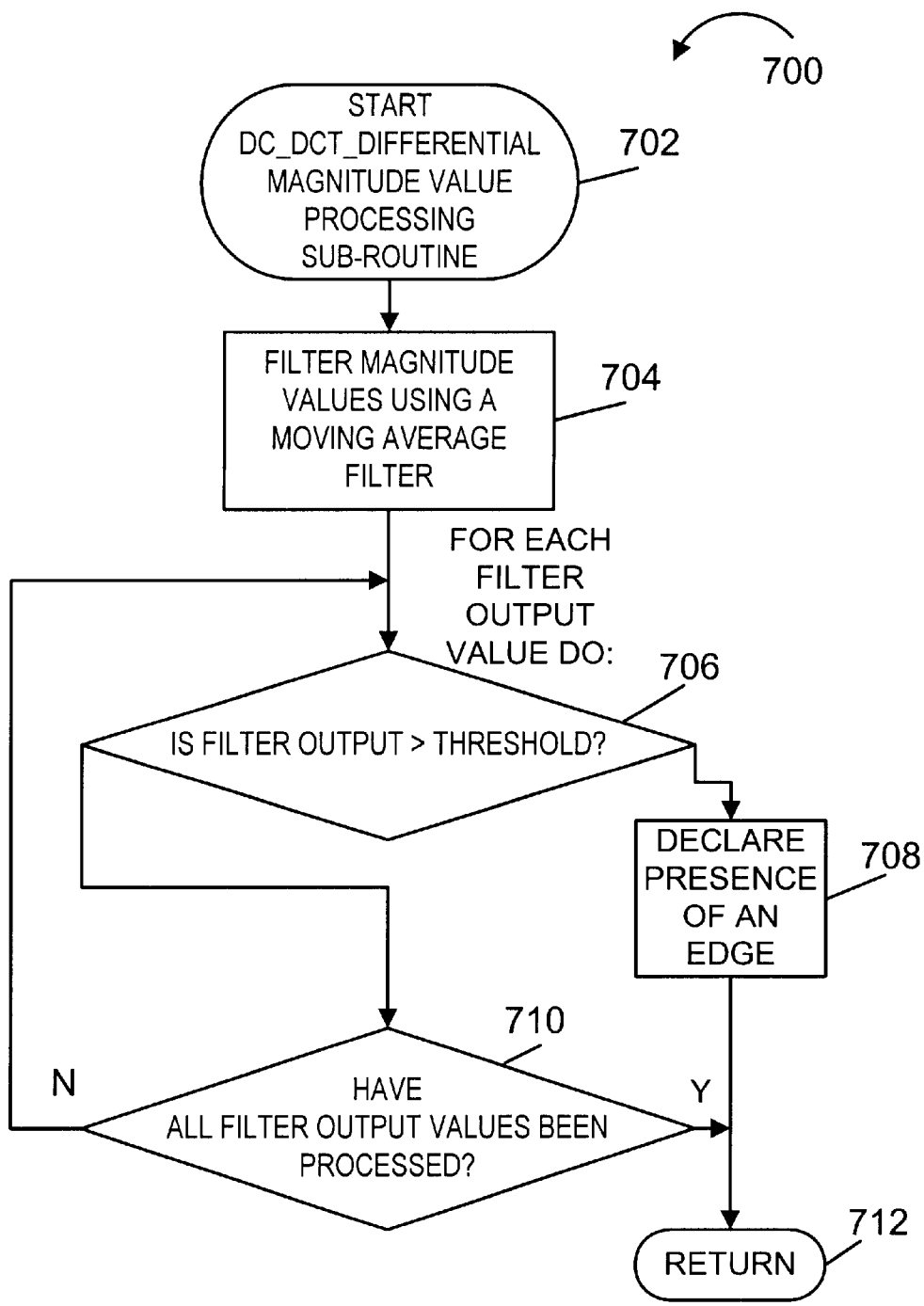
FIGS. 7–9 illustrate sub-routines suitable for use in conjunction with the method illustrated in FIG. 6.

The dc_dct_differential magnitude processing subroutine 700 illustrated in FIG. 7 implements edge detection using a moving average filter.

As illustrated in FIG. 7, the routine 700 begins in step 702. From step 702 operation proceeds to step 704 wherein the dc_dct_differential magnitude values are summed to implement a moving average filter. Rather than perform a division operation to directly produce an average, the number of samples that are summed by the filter is taken into consideration when selecting an edge detection threshold thereby avoiding the need to perform an actual division operation. Thus, a portion of the moving average filter is effectively implemented as part of the subsequent threshold test. Thus, in step 704 a plurality of filter output values (dc_dct_differential sums) are generated. The filter output values may be generated sequentially, as dc_dct_differential magnitude values are processed by the sliding window of the moving average filter. Each filter output value is passed from step 704 to step 706 wherein it is compared to an edge detection threshold (THRESHOLD).

If in step 706, it is determined that the filter output value exceeds the edge detection threshold, operation proceeds to step 708 wherein the presence of an edge in the image segment being processed is declared, e.g., indicated. This may involve, e.g., sending a signal from the CPU 55 of the edge detection circuit to the video decoder 53 indicating that an edge was detected in the image data being processed.

Once an edge is declared present in step 708, there is no need to generate and/or check the remaining filter output values. Accordingly, operation proceeds from step 708 back to the edge detection routine 51 via return step 712 which is then stopped in step 614.

However, in step 706, if it is determined that the filter output value, e.g., sum of dc_dct_differential values, being examined does not exceed the edge detection threshold (THRESHOLD), operation proceeds to step 710. In step 710 a check is made to determine if all filter output values have been processed. If it is determined that additional filter outputs remain to be processed, operation proceeds once again to step 706 where the next filter output value is tested against the edge detection threshold. However, if in step 710 it is determined that all filter output values have been processed, operation returns, via step 712, to the edge detection routine 51 without the presence of an edge being declared.

While the moving average filter used in the FIG. 7 embodiment, provides one statistic that is useful for detecting edges other statistics and/or filters may be used. For example, filtering may be applied to determine when the current value of the DCT DC differential is greater than half the previous value and a counter of the occurrences can be kept. If $\delta(k)$ is used to denote the current value of the absolute differential then the event $\vartheta$ occurs:

$$\text{when: } \vartheta = \begin{cases} 1 & \text{if } \{\delta(k) > \delta(k-1)/2\} \\ 0 & \text{otherwise} \end{cases} \quad (1)$$

The choice of $\delta(k-1)/2$ as a threshold is made because experiments show that it provides good performance and because its computation is a matter of performing a relatively inexpensive right shift. However, other filter threshold values may be equally appropriate depending upon the situation.

In one embodiment to be discussed further below, whenever the event $\{\vartheta=1\}$ occurs, a counter, C, is incremented. When the event $\{\vartheta=0\}$ occurs, the value of the counter C is tested to check how many times the event $\{\vartheta=1\}$ occurred in succession. The value of the counter C may be compared directly to a threshold to determine the presence or absence of an edge. In one embodiment, when C exceeds a preselected threshold, the presence of an edge is declared.

However, in another embodiment, the edge detection process is further refined. In the more refined embodiments illustrated in FIGS. 8 and 9 additional thresholds are used in an attempt to exclude out of the count, used in making the ultimate edge detection determination, at least some consecutive dc_dct_differential magnitude values which correspond to short transitions due to variations in image content as opposed to a consistent edge which extends for several macroblocks. In this more elaborate embodiment, if the counter C indicates that {θ=1} occurred more that n consecutive times, then the value of the count, C, is accumulated into a separate counter, A. The counter A maintains a cumulative count of the events {θ=1} that occurred more than n consecutive times. Periodically or when all the dc_dct_differential magnitude values used for edge detection in a row or column of macroblocks have been considered, the value of the counter A is compared to an edge detection threshold T2. If A is greater than threshold T2, then the presence of an edge is declared. The computational cost of this method is relatively small compared to the known gradient edge detection method discussed above.

To understand this method, consider the nature of the differentials in FIG. 11. Here, the differential magnitudes used for horizontal edge detection purposes exhibit a significant run of near constant differentials in the region where an edge exists.

The effect of this is that there will be long runs of the event {θ=1} resulting, as desired, in the detection of an edge. On the other hand, considering the nature of the differentials in an image with significant activity, e.g., variations throughout a row of macroblocks, the "noisy" character of the differentials due to normal scene changes will result in short runs of the event {θ=1}. The "admittance test" of the run length (C>n) has the effect of blocking these occurrences from the accumulator A. This way, it is possible to control the sensitivity of the detection method and avoid the detection of false edges.

Suitable values of n and t were determined in one embodiment through experimentation. It was found from experiment that choosing n=5 and T2=0.75*n_mb_h, where n_mb_h is the number of macroblocks that constitute one row of the picture, provided a satisfactory edge detection performance. Again, other values for these parameters may be equally or more appropriate depending upon the application.

Decreasing the value of n loosens the admissibility condition and thereby increases the sensitivity of the process to changes in the dc_dct_differentials that are due to heavy picture detail.

Figure 8:
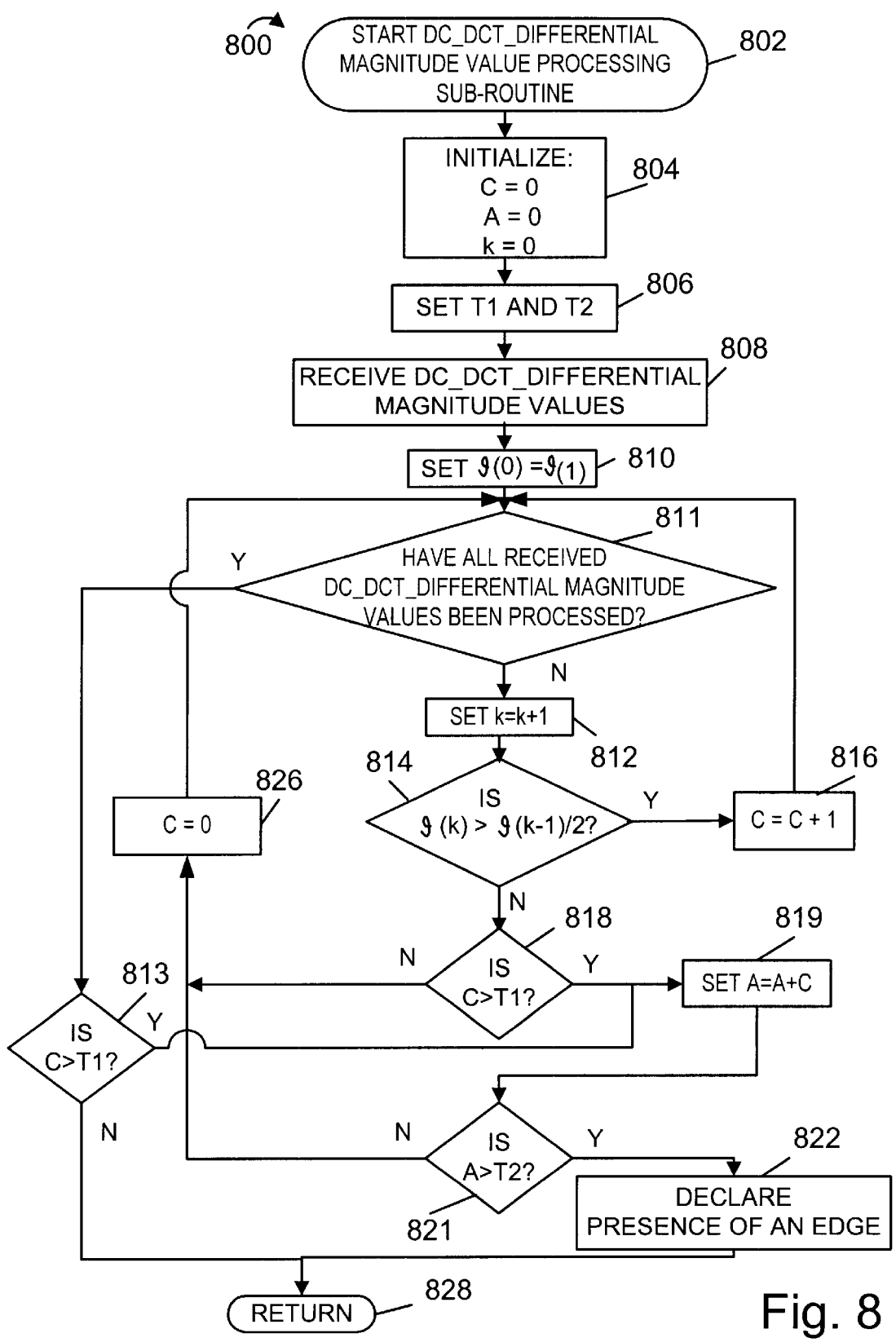
Figure 9:
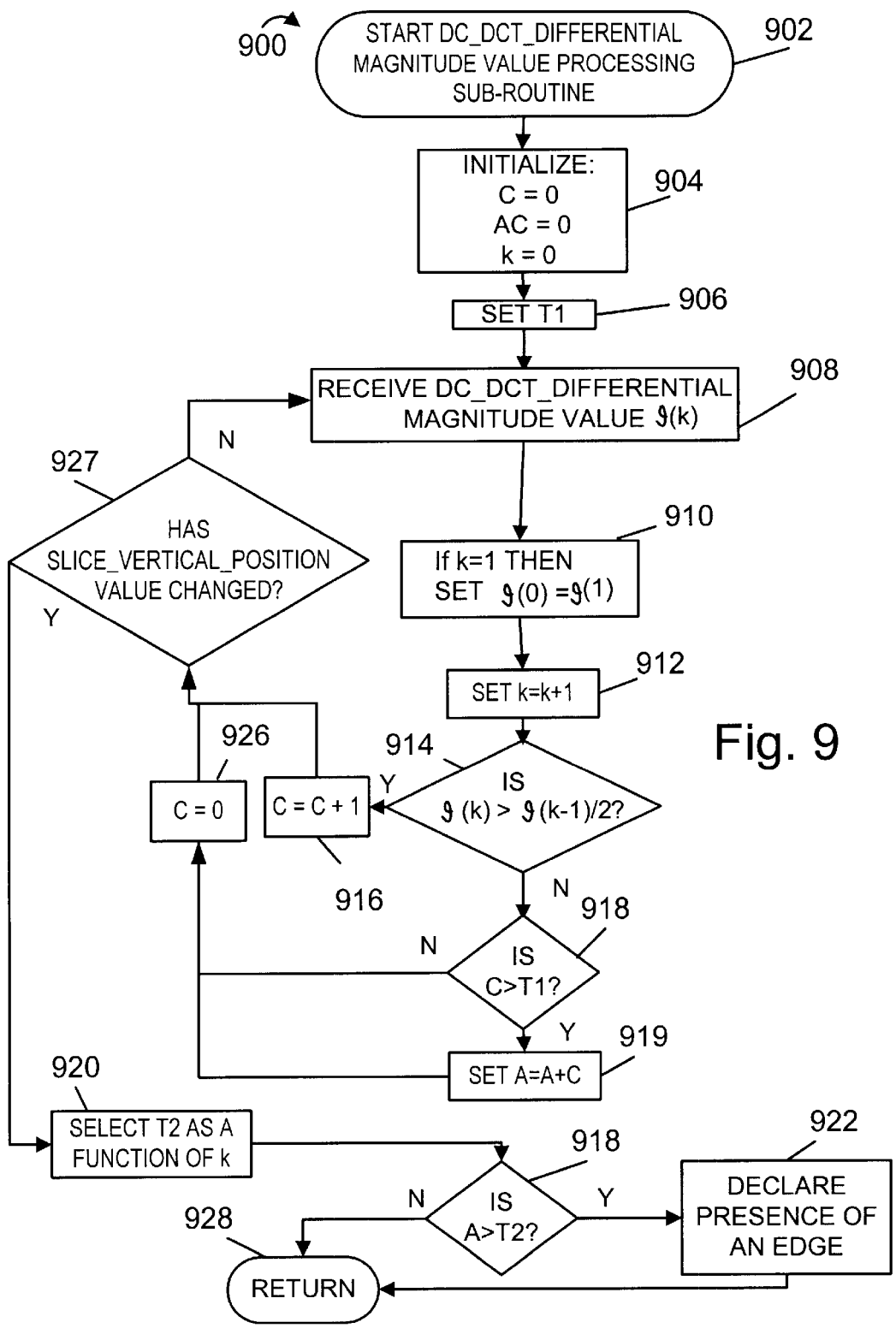

Various embodiments of the method discussed above, which uses a count of consecutive events, are shown in FIGS. 8 and 9 which illustrate additional dc_dct_differential magnitude value processing sub-routines 800, 900 of the present invention.

The dc_dct_differential magnitude value processing routine 800 begins in start step 802, e.g., when it is called by step 612 of the edge detection routine 51. From step 802, operation proceeds to step 804 wherein various counter values C, A, and k, are initialized to 0. The C counter value is used as a consecutive event counter while the A counter value is used as an accumulated consecutive event counter. The counter value k is used as a work counter to keep track of the dc_dct_differential magnitude value being processed.

In step 806, thresholds T1 and T2 are initialized to values which have been previously determined or selected for the particular application. Threshold T1 is the consecutive event admittance threshold (n) which must be exceeded for the count C of consecutive events to be added to the value A. Threshold T2 represents the threshold against which the accumulated consecutive event counter value A is compared to determine the presence of an edge in the image portion to which the data being processed corresponds.

From step 806, operation proceeds to step 808 wherein dc_dct_differential magnitude values θ to be processed starting with θ(1) are received. Then, in step 810, the dc_dct_differential magnitude value θ(0) is set equal to θ(1) as part of an initialization step.

Next, in step 811, a check is made to determine if all the received dc_dct_differential, magnitude values have been processed for edge detection, e.g., if they have been processed by step 812 onward. Since, the first time step 811 is encountered, none of the received dc_dct_differential magnitude values have been processed by step 812, operation proceeds to step 812. In subsequent iterations through step 811, operation proceeds to step 812 whenever there are one or more dc_dct_differential magnitude values remaining to be processed.

However, once all of the received dc_dct_differential magnitude values have been processed, operation proceeds from step 811 to step 813 where the count C is compared to the consecutive event threshold T1. If, in step 813, the value C is determined to be greater than the threshold T1 than operation proceeds to step 819, otherwise it proceeds to return step 828.

Referring once again to step 812, it can be seen that in this step the counter value k is incremented by 1. Then, in step 814 a determination is made as to whether or not the DC_DCT_magnitude value θ(k) satisfies the criterion that it be greater than θ(k-1)/2. If it is determined that the criterion is satisfied, operation proceeds to step 816 wherein the counter C is incremented by 1 prior to operation returning once again to step 811.

However, if in step 814 it is determined that the criterion are not satisfied, operation proceeds to step 818 wherein a test is made to determine if the count C of consecutive events exceeds the threshold T1.

If in step 818 it is determined that C is not greater than T1, operation proceeds to step 826 wherein the value of the counter C is reset to 0 before operation proceeds once again to step 811. However, if in step in step 818, it is determined that C is greater that T1, operation proceeds to step 819 wherein the value A is incremented by the value of C. Operation then proceeds to step 821 wherein the incremented value of A is compared to T2, the edge detection threshold. If A>T2, operation proceeds to step 822 where an edge is declared to be present in the image portion being examined. Then operation returns via step 828 to the edge detection routine 51 wherein operation is stopped in step 614.

In the FIG. 8 embodiment, processing of dc_dct_differential magnitude values continues until an edge is declared present or all the dc_dct_differential magnitude values being used for detection purposes for a given image segment, e.g., row of macroblocks, are processed.

FIG. 9 illustrates a dc_dct_differential magnitude value processing sub-routine of the present invention which is used specifically to detect edges within rows of macroblocks. While the FIG. 9 embodiment has many steps which are similar to those of the FIG. 8 embodiment, in the FIG. 9 embodiment the threshold test used to detect the presence of an edge is not applied until a change in the slice_ vertical_position, marking the end of a set of data corresponding to a row of macroblocks, is observed.

The dc_dct_differential magnitude value processing routine 900 begins in start step 902, e.g., when it is called by step 612 of the edge detection routine 51. From step 902, operation proceeds to step 904 wherein various counter values C, A, and k, are initialized to 0. The C counter value is used as a consecutive event counter while the A counter value is used as an accumulated consecutive event counter. The counter value k is used as a work counter to keep track of the dc_dct_differential magnitude value being processed.

In step 906, threshold T1 is initialized to a value that has been previously determined or selected for the particular application. Threshold T1 is the consecutive event admittance threshold that must be exceeded for the count C of consecutive events to be added to the value A. An exemplary value for T1 is 5.

Threshold T2 represents the threshold against which the accumulated consecutive event counter value A is compared to determine the presence of an edge in the image portion to which the data being processed corresponds. An exemplary value for T2 is 0.75*(# of macroblocks in an entire row). In the case of a row with 120 macroblocks, a suitable value for T2 would be 90.

From step 906, operation proceeds to step 908 wherein a dc_dct_differential magnitude value to be processed is received. In step 908, a dc_dct_differential magnitude value $\vartheta(k+1)$ is received. Then, in step 10, when k=0, the dc_dct_differential magnitude value $\vartheta(0)$ is set equal to $\vartheta(1)$ as part of an initialization step.

Next, in step 912, the counter value k is incremented by 1. Then, in step 914 a determination is made as to whether or not the DC_DCT_magnitude value $\vartheta(k)$ satisfies the criterion that it be greater than $\vartheta(k-1)/2$. If it is determined that the criterion is satisfied in step 914, operation proceeds to step 916 wherein the counter C is incremented by 1 prior to operation proceeding to step 927.

However, if in step 914 it is determined that the criterion is not satisfied, operation proceeds to step 918 wherein a test is made to determine if the count C of consecutive events exceeds the threshold T1.

If in step 918 it is determined that C is not greater than T1, operation proceeds to step 926 wherein the value of the counter C is reset to 0 before operation proceeds to step 927. However, if in step 918, it is determined that C is greater that T1, operation proceeds to step 919 wherein the value A is incremented by the value of C. Operation then proceeds to step 926 wherein the value of C is reset to 0. From step 926 operation proceeds to step 927.

In step 927, a determination is made as to whether or not a received slice_vertical_position signal differs from a previously received slice_vertical_position value indicating the end of the macroblock data for a row. If it is determined that the slice_vertical_position signal has not changed, indicating that data for the same macroblock row is still being processed, operation proceeds to step 908 and another dc_dct_differential magnitude value is received, e.g., from edge detection routine 51.

However, if in step 927, it is determined that the slice_vertical_position signal has changed, indicating that the complete set of data for a row of macroblocks has been received, operation proceeds to step 920 wherein the threshold T2 is selected as a function of k, the number of dc_dct_differential magnitude values which were used in generating the accumulated value A or as a function of the number of macroblocks in a row. When threshold T2 is determined as a function k, one exemplary threshold for T2 is determined as 3k/8.

With the threshold T2, used for edge detection purposes set, operation proceeds to step 918 wherein A is compared to T2. If A>T2, operation proceeds to step 922 and an edge is declared present in the image row to which the processed DC_DCT_magnitude values corresponds. From step 922 operation proceeds to return step 928.

In step 918, if it is determined that A does not exceed T2, operation proceeds directly to return step 928 without the presence of an edge being declared. From step 928 operation returns to the edge detection routine 51 wherein processing is stopped in step 614, e.g., pending the processing of another row of image data.

Figure 13:
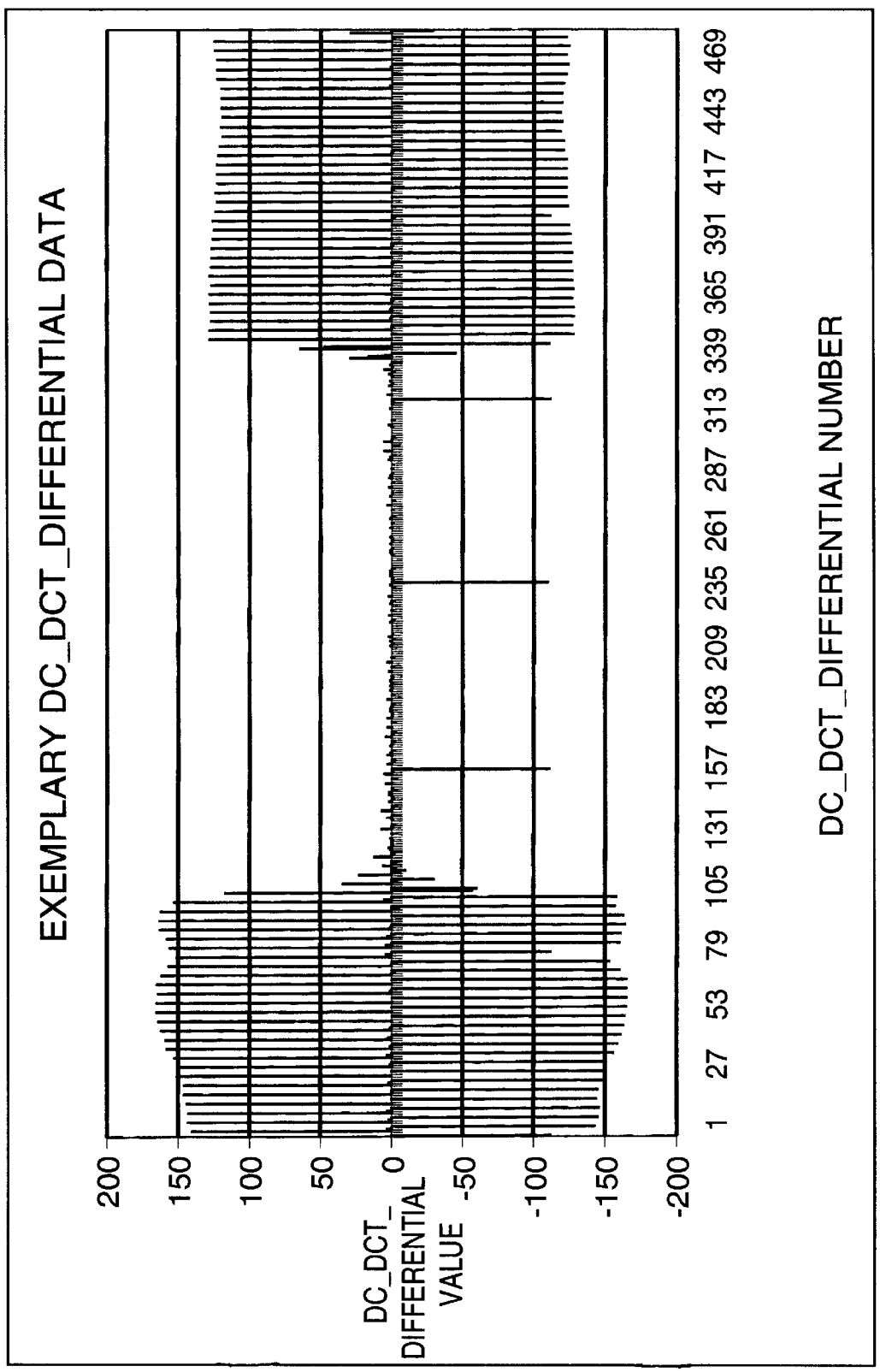
FIG. 13 is a graph of exemplary dc_dct_differential values corresponding to a row of macroblocks of an exemplary image.
Figure 14:
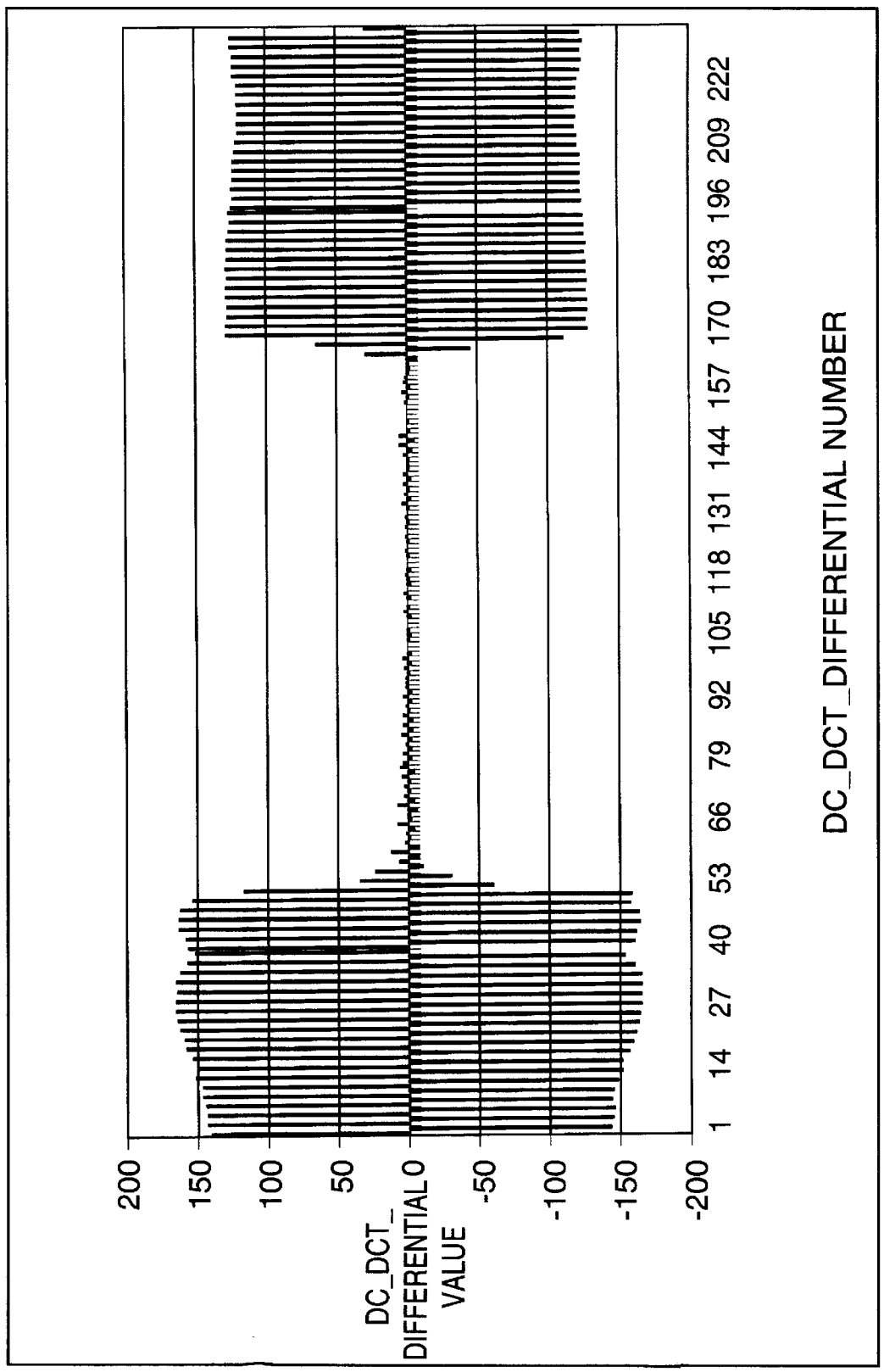
FIG. 14 illustrates the dc_dct_differential values remaining after removing selected dc_dct_differential values from the values illustrated in FIG. 13.
Figure 15:
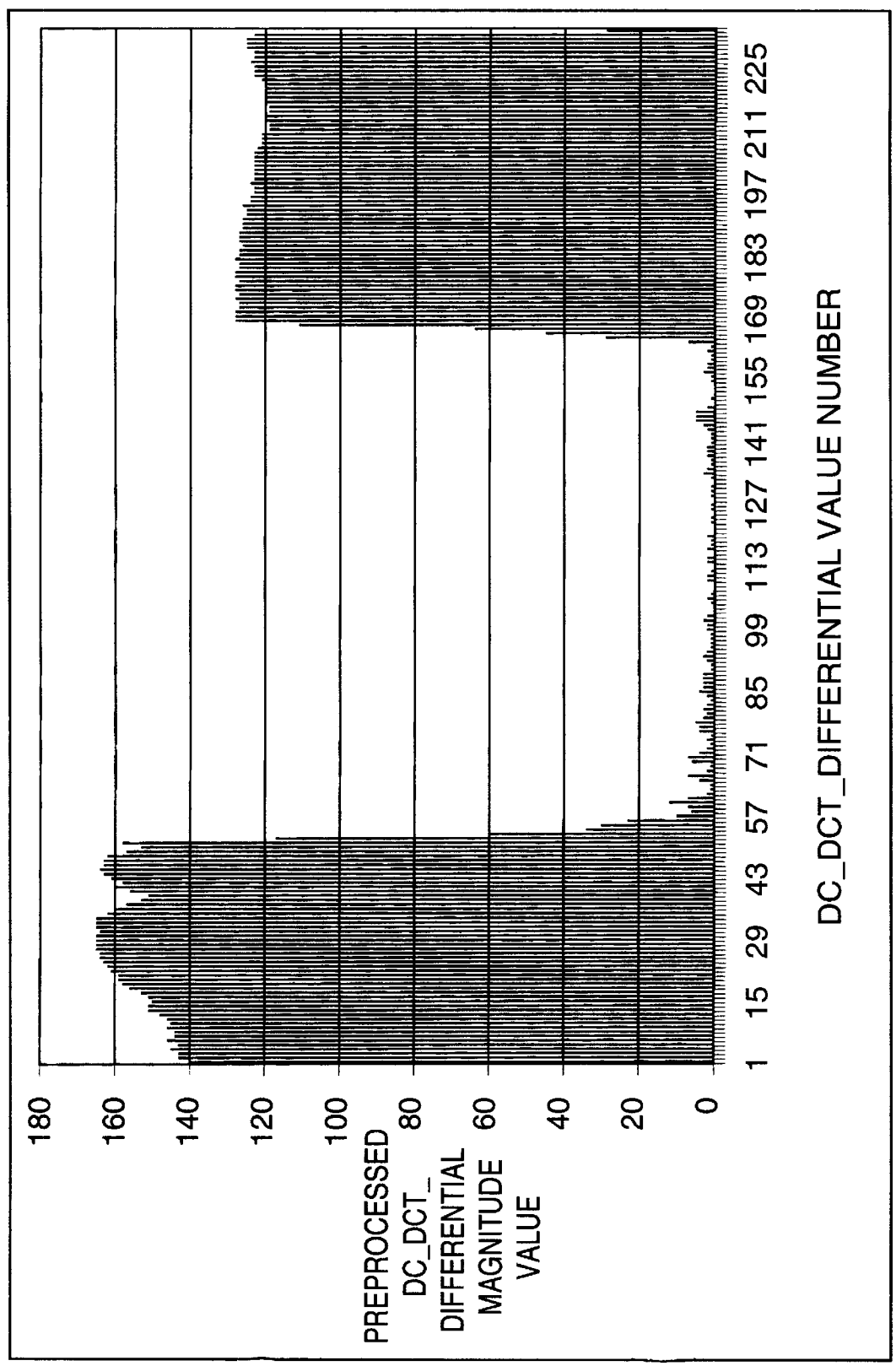
FIG. 15 illustrates the dc_dct_differential magnitude values resulting from taking the absolute values of the dc_dct_differential values illustrated in FIG. 14.

The FIGS. 8 and 9 edge detection techniques of the present invention can be appreciated with a review of FIGS. 13–15 which illustrate data corresponding to a row of macroblocks. FIG. 13 illustrates dc_dct_differential data corresponding to a row of 120 macroblocks from a row of an image having strong horizontal left and right edges and little or no edge towards the center of the row. Accordingly, FIG. 13 illustrates dc_dct_differential values corresponding to 480 blocks. Such data is exemplary of the output of step 606 of edge detection routine 51. Note the large periodic negative values towards the center of FIG. 13 which correspond to the first block of each slice in the row to which the illustrated values correspond.

FIG. 14 illustrates the effect of eliminating the dc_dct_differential values corresponding to the second and fourth blocks (blocks 1 and 3) of each macroblock, the dc_dct_differential values corresponding to the first block of each slice, from the data illustrated in FIG. 13. As a result of eliminating data from FIG. 13; the FIG. 14 graph includes 234 dc_dct_differential values as opposed to the 480 values illustrated in FIG. 13. The data illustrated in FIG. 14 is exemplary of the data output by step 608 of the edge detection routine 51.

FIG. 15 illustrates the effect of taking the absolute value of the dc_dct_differential values illustrated in FIG. 14. Thus, FIG. 15 illustrates 234 dc_dct_differential magnitude values corresponding to a row of 120 macroblocks which can be used in accordance with the present invention for horizontal edge detection purposes. Accordingly, FIG. 15 is exemplary of the data which is output by step 610 and supplied to the dc_dct_differential magnitude processing sub-routines 800, 900 in horizontal edge detection embodiments.

The methods and apparatus of the present invention may be used in, e.g., applications that involve the detection of edges as part of the MPEG-2 video decoding process. For example, in downsampling video decoders it is sometimes useful to find the location of edges with an image that may contribute to the generation of visually disturbing artifacts. The present invention can also be used in computer and other display devices which display images in letterbox format. The edge detection techniques of the present invention can be used identify the upper and lower black border regions of a letterbox image and thereby permitting the display device to be controlled to display only the center, active region of a letterbox images.

Numerous additional embodiments, within the scope of the present invention, will be apparent to those of ordinary skill in the art in view of the above description and the claims which follow.

What is claimed is:

1. A method of detecting an edge within an image represented by encoded image data including differential values, the method comprising the steps of:
   filtering a plurality of said differential values to produce a filter output value; and
   performing a threshold test as a function of the filter output value to determine whether the image represented by the encoded image data includes an edge.

2. The method of claim 1, further comprising the steps of:
   receiving the encoded image data; and
   selecting, from the encoded image data, differential values corresponding to vertically displaced image portions to be included in said plurality of differential values.

3. The method of claim 2, wherein said differential values are dc__dct__differential values corresponding to a row of macroblocks; and
   wherein the step of selecting from the encoded image data differential values includes:
      selecting dc__dct__differntial values corresponding to first and third blocks of each macroblock.

4. The method of claim 2,
   wherein said differential values are dc__dct__differential values corresponding to a row of macroblocks; and
   wherein the step of selecting from the encoded image data differential values includes:
      selecting dc__dct__differntial values corresponding to first and third blocks of each macroblock while excluding dc__dct__differential values corresponding to the first block of each slice from said plurality of differential values.

5. The method of claim 1, further comprising the steps of:
   receiving the encoded image data; and
   selecting, from the encoded image data, differential values corresponding to horizontally displaced image portions to be included in said plurality of differential values.

6. The method of claim 5,
   wherein said differential values are dc__dct__differential values corresponding to a column of macroblocks; and
   wherein the step of selecting from the encoded image data differential values includes:
      selecting dc__dct__differntial values corresponding to second and fourth blocks of each macroblock.

7. The method of claim 1, wherein the filtering includes:
   summing a plurality of differential values to produce the filter output value; and wherein the step of performing a threshold test includes:
      comparing the filter output value to a threshold value.

8. The method of claim 7, wherein the filter uses more than 20 differential values to produce each filter output value.

9. The method of claim 1, further comprising the step of:
   generating a signal indicating that an edge has been detected when the threshold test indicates that the filter output value exceeds the threshold value.

10. The method of claim 2, further comprising the step of:
    generating a signal indicating that a horizontal edge has been detected, when the threshold test indicates that the filter output value exceeds the threshold value.

11. The method of claim 1, wherein the filtering includes:
    counting a number of consecutive differential values which satisfy a preselected criterion.

12. The method of claim 11, wherein the filtering operation further includes the step of:
    comparing the counted number of consecutive differential values which satisfy the first preselected criterion to an accumulation threshold; and
    adding the number of consecutive differential values to an accumulated consecutive event counter value when the number of consecutive differential values exceeds the accumulation threshold, the accumulated consecutive event counter value being the filter output value.

13. The method of claim 12, wherein the step of performing a threshold test includes:
    comparing the accumulated consecutive event counter value to an edge detection threshold value.

14. The method of claim 12, wherein the preselected criterion is based on a preceding differential value for differential values other than the first one of the plurality of differential values.

15. A method of processing encoded image data including a first set of differential values, the method comprising the steps of:
    selecting from the first set of differential values differential values corresponding to vertically displaced image portions to generate a second set of differential values which is smaller than the first set;
    using the second set of differential values to determine whether a horizontal edge is present in the image represented by said encoded image data.

16. The method of claim 15, wherein the step of using the second set of differential values includes the steps of:
    performing a filtering operation using the second set of differential values; and
    determining from the result of the filtering operation whether an edge is present in the image portion represented by said encoded image data.

17. The method of claim 16, wherein the step of determining from the result of the filtering operation whether an edge is present includes:
    comparing a value generated by the filtering operation to an edge detection threshold value.

18. The method of claim 17, further comprising the step of:
    generating a signal indicating the presence of a horizontal edge when the value generated by the filtering operation exceeds the edge detection threshold.

19. The method of claim 15, wherein the differential values are dc__dct__differential values.

20. An image processing system comprising:
    means for receiving encoded image data representing an image, the encoded image data including a plurality of differential values; and
    means for processing the plurality of differential values to detect the presence of an edge in said image.

21. The image processing system of claim 20, wherein the means for processing the plurality of differential values includes:
    a filter for filtering differential values corresponding to vertically displaced image segments; and
    means for comparing a value generated by the filter to an edge detection threshold.

22. The image processing system of claim 20, further comprising:
    a video decoder coupled to the means for processing the plurality of differential values; and means for indicating to the video decoder that an edge is present in encoded video data being processed when the value generated by the filter exceeds the edge detection threshold.

23. The image processing system of claim 22, wherein the differential values are MPEG-2 dc_dct_differential values.

24. A machine readable medium comprising computer executable instructions for controlling a machine to:

identify dc_dct_differential values included in a encoded data representing an image; and performing an edge detection operation to detect an edge in said image by examining the identified dc_dct_differential values.

25. The machine readable medium of claim 24, wherein the medium further comprises computer executable instructions for controlling a machine to:

filter dc_dct_differential values and to compare a filter output value to an edge detection threshold as part of performing an edge detection operation.

* * * * *